(12) United States Patent
Maesaka et al.

(10) Patent No.: US 6,596,418 B2
(45) Date of Patent: Jul. 22, 2003

(54) MAGNETIC RECORDING MEDIUM COMPRISING AN ARTIFICIAL LATTICE FILM CONTAINING B AND O ELEMENTS

(75) Inventors: Akihiro Maesaka, Kanagawa (JP); Hiroyuki Ohmori, Kanagawa (JP)

(73) Assignee: Sony Corporation, Tokyo (JP)

( * ) Notice: Subject to any disclaimer, the term of this patent is extended or adjusted under 35 U.S.C. 154(b) by 36 days.

(21) Appl. No.: 09/892,021

(22) Filed: Jun. 26, 2001

(65) Prior Publication Data

US 2002/0015864 A1 Feb. 7, 2002

(30) Foreign Application Priority Data

Jun. 30, 2000 (JP) .................... P2000/200370

(51) Int. Cl.$^7$ .................... G11B 5/66; G11B 5/667
(52) U.S. Cl. .................... 428/694 T; 694/694 TM; 694/698; 694/702; 694/704
(58) Field of Search .................... 428/694 T, 694 R, 428/693, 698, 702, 704, 694 TM

(56) References Cited

U.S. PATENT DOCUMENTS

| 5,051,856 | A | * | 9/1991 | Narishige et al. ............ 360/126 |
| 5,830,569 | A | * | 11/1998 | Hikosaka et al. ............ 428/332 |
| 5,830,584 | A | * | 11/1998 | Chen et al. .................. 428/611 |
| 6,143,388 | A | * | 11/2000 | Bian et al. .................. 428/65.3 |
| 6,174,582 | B1 | * | 1/2001 | Bian et al. .................. 428/65.3 |
| 6,187,408 | B1 | * | 2/2001 | Bian et al. .................. 428/65.3 |
| RE37,748 | E | * | 6/2002 | Chen et al. ............... 204/192.2 |
| 6,403,241 | B1 | * | 6/2002 | Chen et al. ............ 428/694 TS |

* cited by examiner

Primary Examiner—H. Thi Le
(74) Attorney, Agent, or Firm—Sonnenschein, Nath & Rosenthal

(57) ABSTRACT

To provide a magnetic recording medium which greatly decreases a transition noise in a layered magnetic recording layer, excels in an S/N ratio, and is suited for short wavelength recording, the magnetic recording medium includes a vertical magnetic recording film comprising an artificial lattice film formed by alternately layering a Pt or Pd layer and a Co layer and containing B and O elements.

13 Claims, 14 Drawing Sheets

MAGNETIC RECORDING MEDIUM COMPRISING AN ARTIFICIAL LATTICE FILM CONTAINING B AND O ELEMENTS

BACKGROUND OF THE INVENTION

1. Technical Field

The present invention relates to a magnetic recording medium used for a hard disc, magnetic tape, floppy disc, magneto-optical disc, and the like.

2. Prior Art

While there is an increasing demand for high-density recording of information, the in-plane magnetic recording for regarding magnetic recording media causes a problem of thermal demagnetization in which recording magnetization attenuates with the lapse of time.

The vertical magnetic recording is a technique of solving the problem of the in-plane magnetic recording. A CoCr alloy is widely researched as a magnetic material for vertical magnetic recording media.

When the CoCr alloy is used as a magnetic material for vertical magnetic recording media, its vertical magnetic anisotropy is smaller than the saturation magnetization. This causes a disadvantage that a vertical rectangular ratio does not become 1. Consequently, a reverse magnetization region is generated in a long wavelength recording portion on a CoCr alloy's magnetic layer. It is widely known that this causes a noise.

This problem can be solved by using a material with increased vertical magnetic anisotropy for the magnetic layer of vertical magnetic recording media. An example of such a magnetic layer is a layered magnetic layer which is formed by alternately layering Co and Pt or Pd.

When the magnetic recording medium includes such a layered magnetic recording layer formed by alternately layering Co and Pt or Pd, a vertical magnetic anisotropy magnetic field on the layered magnetic recording layer is sufficiently larger than demagnetization due to saturation magnetization. The layered magnetic layer causes little noises, but too much transition noises, which are ineffective for short wavelength recording.

BRIEF SUMMARY OF THE INVENTION

The present invention has been made in consideration of the foregoing. It is therefore an object of the present invention to provide a magnetic recording medium having a layered magnetic recording layer formed by alternately layering Co and Pt or Pd characterized by greatly decreasing transition noises in the layered magnetic recording layer and suited for short wavelength recording with an excellent S/N ratio.

A magnetic recording medium according to the present invention comprises an artificial lattice film formed by alternately layering a Pt or Pd layer and a Co layer and is characterized by having a vertical magnetic recording film containing B and O.

A magnetic recording medium according to the present invention comprises an artificial lattice film formed by alternately layering a Pt or Pd layer and a Co layer as a layered magnetic recording layer and includes a vertical magnetic recording film containing B and O. Because of this, the transition noises are greatly decreased in the layered magnetic recording layer.

As mentioned above, a magnetic recording medium according to the present invention comprises an artificial lattice film formed by alternately layering a Pt or Pd layer and a Co layer as a layered magnetic recording layer and includes a vertical magnetic recording film containing B and O. Because of this, the greatly decreases transition noises in the layered magnetic recording layer.

Accordingly, the present invention can provide a magnetic recording medium characterized by greatly decreasing transition noises in a layered magnetic recording layer and suited for short wavelength recording with an excellent S/N ratio.

DETAILED DESCRIPTION OF THE INVENTION

Embodiments of the present invention will be described in further detail with reference to the accompanying drawings.

Figure 1:
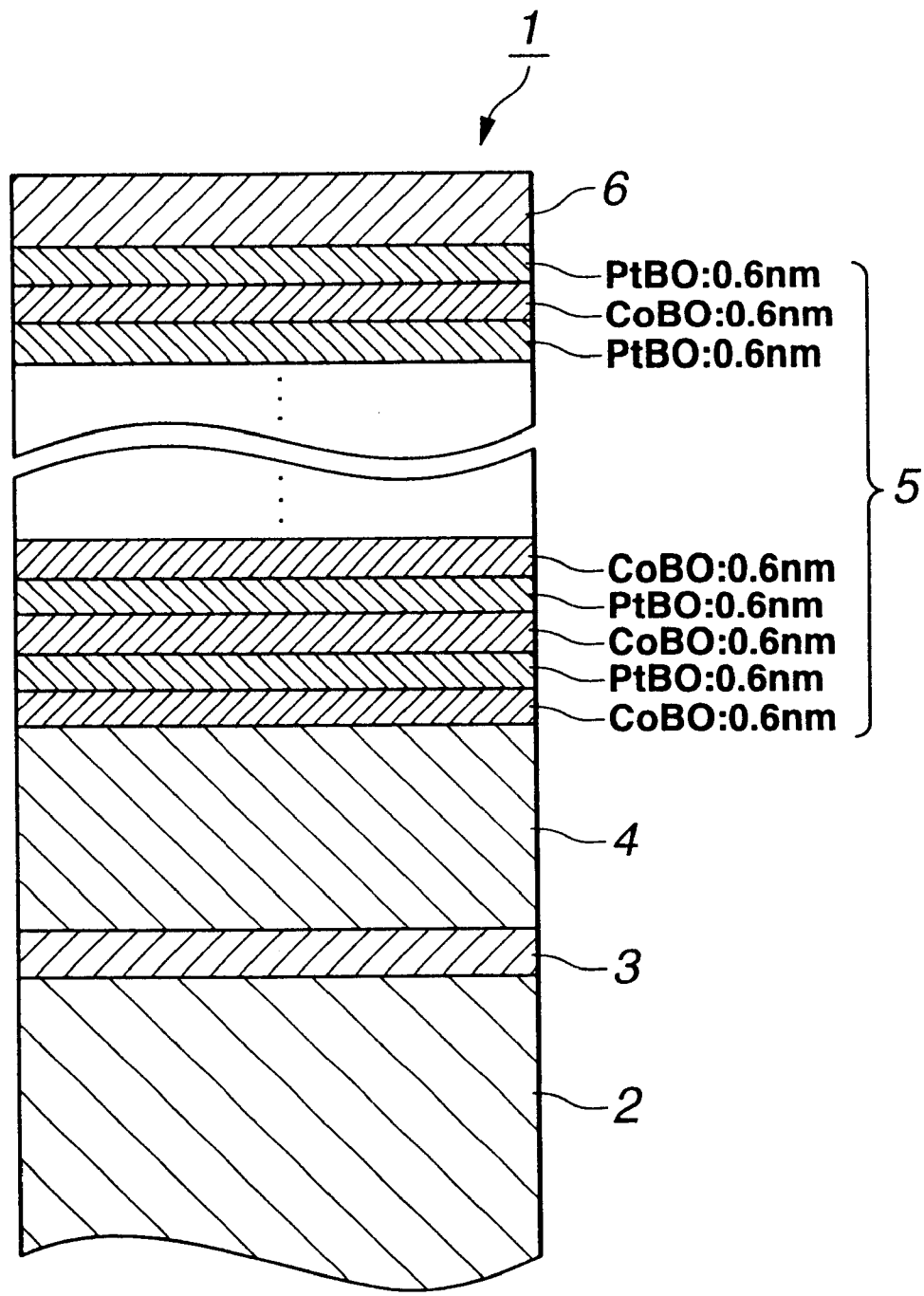
FIG. 1 is a sectional view partially showing a layer structure of a magnetic recording medium example according to the present invention.

The following describes an example of an embodiment according to the present invention with reference to FIG. 1. A magnetic recording medium 1 in FIG. 1 comprises a substrate 2, a bonding layer 3 formed on the substrate 2, a base layer 4 formed on the bonding layer 3, a layered magnetic recording layer 5 formed on the base layer 4, and a protective layer 6 formed on the layered magnetic recording layer 5.

The substrate 2 depends on magnetic recording medium types. Here, a glass plate is used for the substrate 2.

The bonding layer 3 is used for increasing a bonding power between the substrate 2 and the base layer 4. A material for the bonding layer 3 depends on types of the substrate and the base layer 4. When the substrate 2 is a glass plate, the bonding layer 3 can use, say, Ti. Its thickness is, say, 1 nm.

The base layer 4 comprises a material containing metal having a face-centered cubic structure. Specifically, such a material can be Pd, Pt, Au, Ag, Rh, and Ir. Since these materials hardly subject to chemical changes such as oxidization, nitrization, and the like, it is also possible to use these alloys. Here, the base layer 4 uses, say, Pd with a thickness of, say, 20 nm.

The layered magnetic recording layer 5 comprises an artificial lattice film formed by alternately layering the specified number of Pt and Co layers. This artificial lattice film is a vertically magnetized film for vertical magnetic recording compliant with high-density recording. Here, the layered magnetic recording layer 5 is formed by alternately layering 20 Co layers and 20 Pt layers. Each Co layer is, say, 0.4 nm thick. Each Pt layer is, say, 0.6 nm thick. It may be preferable to use a Pd layer or the like instead of the Pt layer.

The protective layer 6 is adherently formed on the layered magnetic recording layer 5. A material for the protective layer 6 can be, say, C with a thickness of, say, 10 nm.

The magnetic recording medium 1 is characterized in that the layered magnetic recording layer 5 contains the B and O elements. These elements are contained in both the Co and Pt layers which constitute the layered magnetic recording layer 5.

Since the layered magnetic recording layer 5 contains the B and O elements, the magnetic recording medium 1 improves crystallographic discreteness for Pt and Co grains as magnetic grains. The crystallographic discreteness of crystal grains causes magnetic discreteness of the relevant crystal grains. Consequently, the magnetic recording medium 1 decreases a transition noise in the layered magnetic recording layer 5 and can improve an S/N ratio.

As regards contents of the B and O elements in the layered magnetic recording layer 5, the B element content is preferably 1 atomic % or more and 15 atomic % or less.

When the B element content in the layered magnetic recording layer 5 is less than 1 atomic %, it is not possible to fully improve the crystallographic discreteness of Pt and Co grains as magnetic grains. As a result, it is not possible to fully provide an effect of decreasing a transition nose in the layered magnetic recording layer 5 and improving the S/N ratio. When the B element content in the layered magnetic recording layer 5 exceeds 15 atomic %, an excess B element enters the crystal grain to degrade the vertical magnetic anisotropy. Consequently, the vertical rectangular ratio becomes 1 or less, degrading the S/N ratio.

The above-mentioned contents should range as described for each Pt and Co layer in the layered magnetic recording layer 5. The magnetic recording medium 1 reliably provides the above-mentioned effect by including the B element in each of Pt and Co layers of the layered magnetic recording layer 5 within the above-mentioned range.

The layered magnetic recording layer 5 preferably contains the O element 0.1 atomic % or more and 10 atomic % or less.

When the O element content in the layered magnetic recording layer 5 is less than 1 atomic %, it is not possible to fully improve the crystallographic discreteness of Pt and Co grains as magnetic grains. As a result, it is not possible to fully provide an effect of decreasing a transition nose in the layered magnetic recording layer 5 and improving the S/N ratio. When the O element content in the layered magnetic recording layer 5 exceeds 10 atomic %, an excess O element enters the crystal grain to degrade the vertical magnetic anisotropy. Consequently, the vertical rectangular ratio becomes 1 or less, degrading the S/N ratio.

The above-mentioned contents should range as described for each Pt and Co layer in the layered magnetic recording layer 5. The magnetic recording medium 1 reliably provides the above-mentioned effect by including the O element in each of Pt and Co layers of the layered magnetic recording layer 5 within the above-mentioned range.

Figure 2:
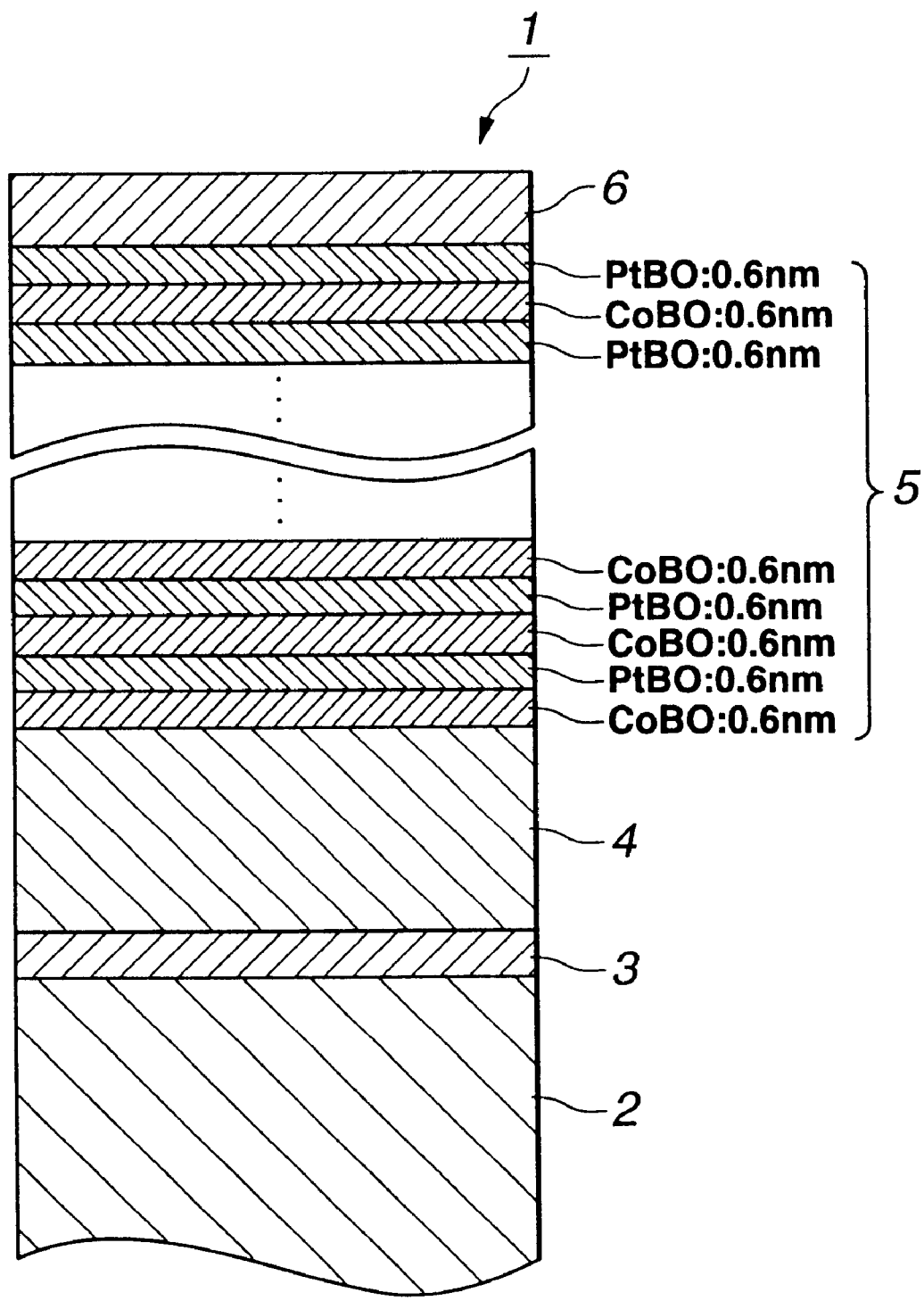
FIG. 2 is a sectional view partially showing a layer structure of a magnetic recording medium example according to the present invention.

As shown in FIG. 2, it may be preferable to configure the base layer 4 using a material including B and O elements as mentioned above. By configuring the base layer 4 with such a material, it is possible to decrease a transition noise in the layered magnetic recording layer 5 comprising Pt and Co layers and improving the S/N ratio. This is because the base layer 4 contains B and O elements to increase the crystallographic discreteness, thus increasing the crystallographic discreteness of the layered magnetic recording layer 5 formed on the base layer 4.

As regards contents of the B and O elements in the base layer 4, the B element content is preferably 1 atomic % or more and 30 atomic % or less.

When the B element content in the base layer 4 is less than 1 atomic %, it is not possible to fully improve the crystallographic discreteness of the base layer 4 and the layered magnetic recording layer 5 formed on the base layer 4. As a result, it is not possible to provide an effect of decreasing a transition nose in the layered magnetic recording layer 5 and improving the S/N ratio. When the B element content in the base layer 4 exceeds 30 atomic %, the base layer's crystal grain sizes become ununiformed. Consequently, the layered magnetic recording layer 5 will have ununiformed crystal grain sizes, degrading the S/N ratio.

The base layer 4 preferably contains the O element 0.1 atomic % or more and 30 atomic % or less. When the O element content in the base layer 4 is less than 1 atomic %, it is not possible to fully improve the crystallographic discreteness of the base layer 4 and the layered magnetic recording layer 5 formed on the base layer 4. As a result, it is not possible to provide an effect of decreasing a transition nose in the layered magnetic recording layer 5 and improving the S/N ratio. When the O element content in the base layer 4 exceeds 30 atomic %, the base layer's crystal grain sizes become ununiformed. Consequently, the layered magnetic recording layer 5 will have ununiformed crystal grain sizes, degrading the S/N ratio.

It is possible to further improve an effect of decreasing a transition nose in the layered magnetic recording layer 5 and improving the S/N ratio by using the layered magnetic recording layer 5 containing the above-mentioned B and O elements together with the base layer 4 containing the above-mentioned B and O elements.

The base layer 4 can be a composite material layer comprising a composite material of any of metals having the face-centered cubic structure such as Pd, Pt, Au, Ag, Rh, and Ir and any of oxides such as $SiO_2$, $Al_2O_3$, MgO, $TiO_2$, $Li_2O$, CaO, ZnO, ZrO, $Y_2O_3$, HfO, and the like. The base layer 4 having such structure can greatly decrease a transition noise in a magnetic recording medium having the layered magnetic recording layer 5 comprising the Pt and Co layers. The above-mentioned composite material can be a composite of any of metals having the face-centered cubic structure such as Pd, Pt, Au, Ag, Rh, and Ir and any of nitrides such as $Si_3N_4$, AlN, BN, TiN, ZrN, GaN, and the like. Further, it can be a composite of any of metals having the face-centered cubic structure such as Pd, Pt, Au, Ag, Rh, and Ir and any of carbides such as SiC, TiC, ZrC, TaC, and the like. In any case, it is possible to provide the same effect as for the composite material of any of metals having the face-centered cubic structure such as Pd. Pt, Au, Ag, Rh, and Ir and any of oxides such as $SiO_2$, $Al_2O_3$, MgO, $TiO_2$, $Li_2O$, CaO, ZnO, ZrO, $Y_2O_3$, HfO, and the like.

Figure 3:
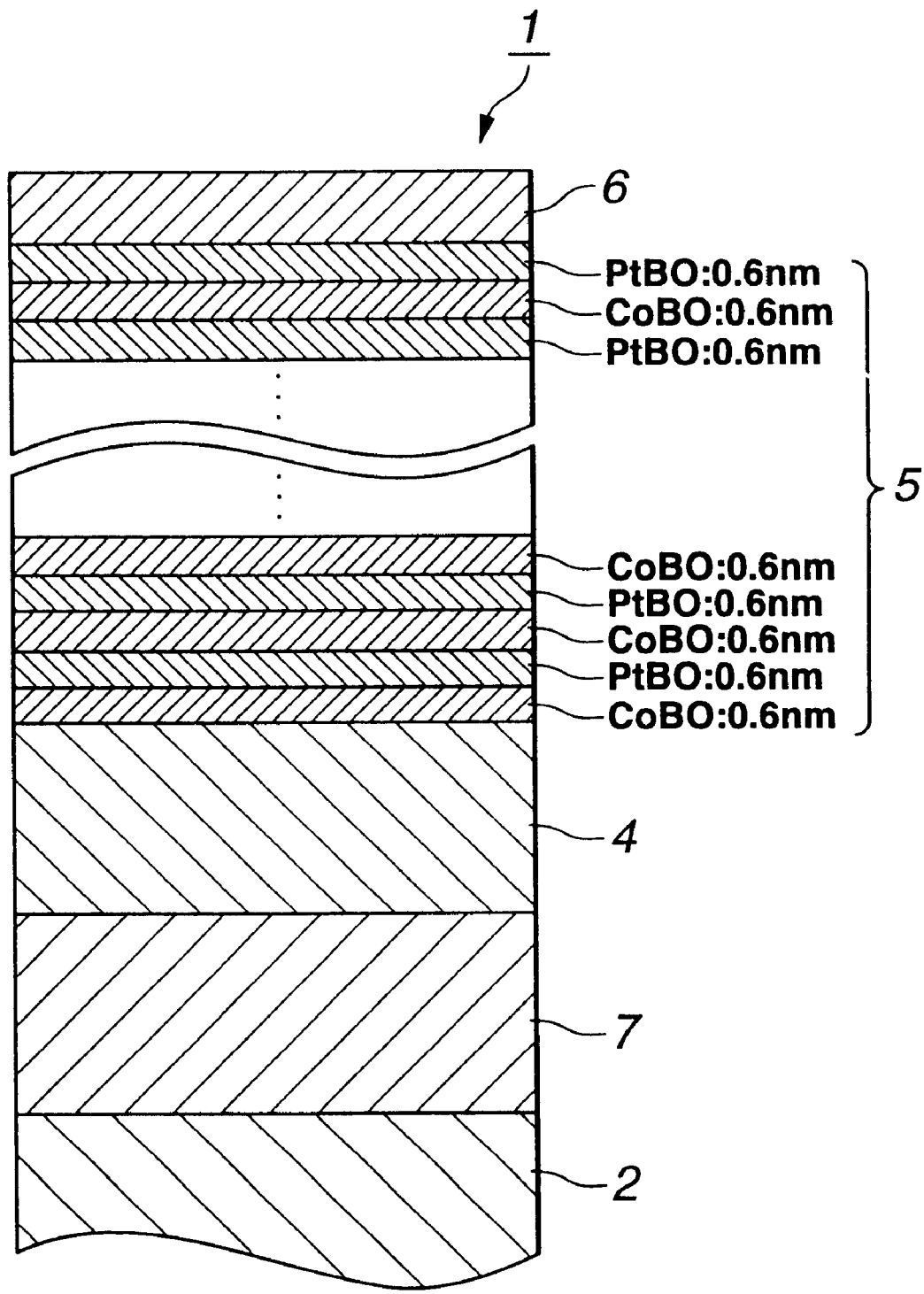
FIG. 3 is a sectional view partially showing a layer structure of a magnetic recording medium example according to the present invention.

When the magnetic recording medium includes the base layer 4 comprising the above-mentioned composite material, it may be preferable to provide a soft magnetic layer just under the base layer 4, namely opposite the layered magnetic recording layer 5 as shown in FIG. 3. It is generally known that it is possible to clearly write recording transition by providing a soft magnetic layer under a magnetic recording layer for vertical recording. On the contrary, however, this structure often increases a noise in the magnetic recording layer. As mentioned above, it is possible to decrease a noise in the magnetic recording layer by providing the base layer 4 comprising the above-mentioned composite material between the soft magnetic layer and the layered magnetic recording layer 5. Namely, it is possible to clearly write the recording transition without increasing a noise in the magnetic recording layer.

At this time, a noise cannot be decreased when the base layer 4 comprising the composite material is thinner than 1 nm. When the base layer is thicker than 30 nm, there is provided too long a distance between the layered magnetic recording layer 5 and the soft magnetic layer, degrading the above-mentioned effect using the soft magnetic layer. Accordingly, when the soft magnetic layer is used, it is preferable to use the base layer 4 comprising the composite material with a thickness of 1 nm or more and 30 nm or less.

In the example of FIG. 3, the soft magnetic layer used is, say, an NiFe layer. The composite material layer used is, say, an $(Au+SiO_2)$ layer 20 nm thick. The layered magnetic recording layer 5 used is formed by alternately layering 20 Pd layers, say, 0.6 nm thick each and 20 Co layers, say, 0.6 nm thick each.

In FIG. 3, the soft magnetic layer uses an NiFe layer, but is not limited thereto. It is also possible to use CoZr, FeN, NiFeTa, and the like.

[Embodiments]

The present invention is described below with reference to embodiments.

<Embodiment 1>

In embodiment 1, a magnetic recording medium is fabricated by including B and O elements in a vertically magnetized film as a layered magnetic recording layer.

Figure 4:
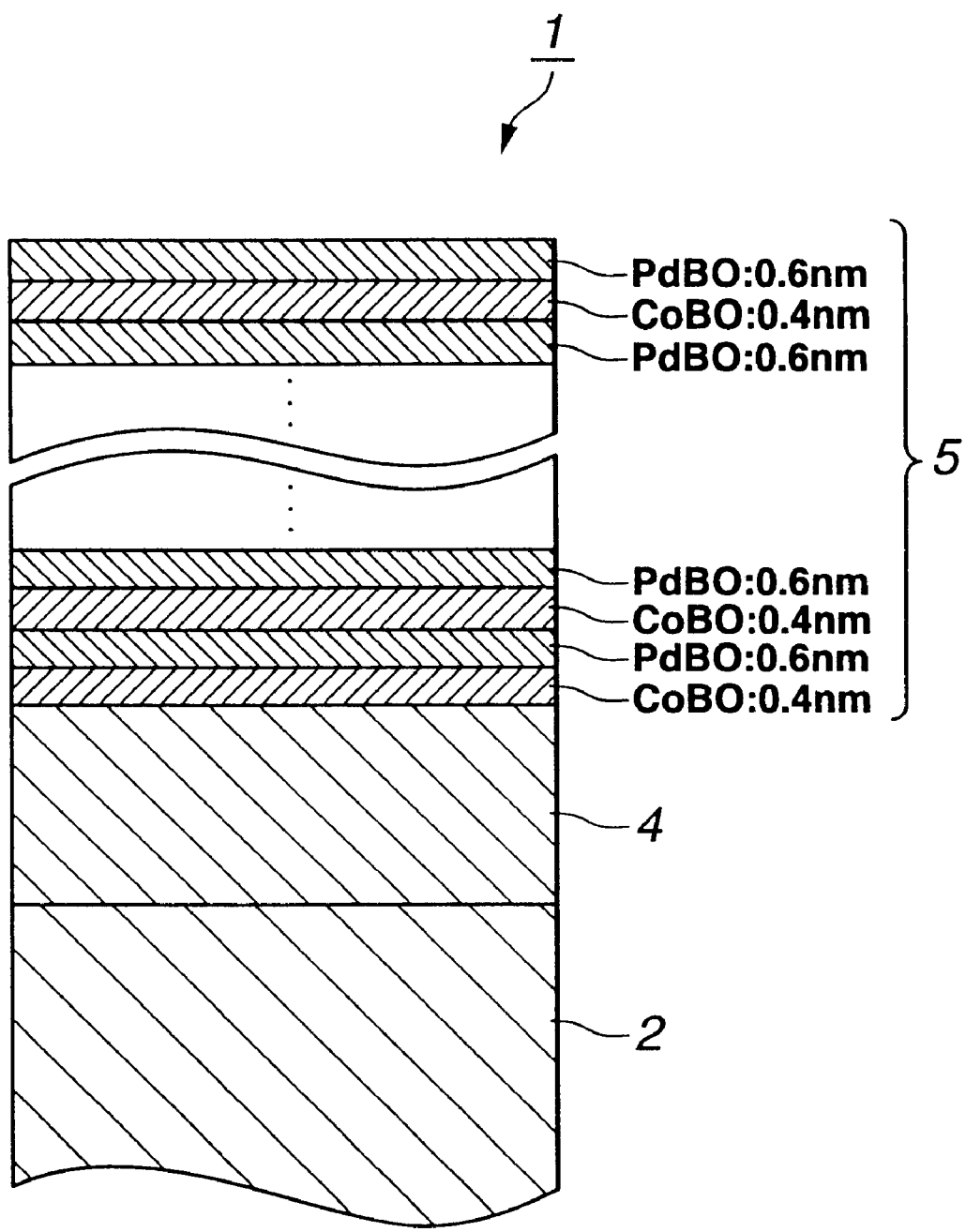
FIG. 4 is a sectional view partially showing a layer structure of a magnetic recording medium fabricated according to embodiments 1, 13, and 14.

The magnetic recording medium is fabricated by forming a base layer and a layered magnetic recording layer in this order on a glass substrate 2.5 in. diameter using the RF sputtering process. The layered magnetic recording layer is formed of a vertically magnetized film comprising an artificial lattice film. The composition and the configuration of each layer are (CoBO: 0.4 nm/PdBO: 0.6 nm)×20/Pd: 20 nm. There is fabricated the magnetic recording medium 1 having a sectional structure as shown in FIG. 4.

Film formation conditions are a pre-sputtering ultimate vacuum of $8×10^{-5}$ Pa and a supplied power of 120 W. As sputtering targets, a Pd target is used for the base layer 4. A target used for the layered magnetic recording layer 5 comprises four B chips, 1 by 1 cm each, arranged on Co and Pd targets as shown in FIG. 4. The base layer 4 is formed by using a sputtering gas pressure of 2 Pa under an Ar atmosphere. The layered magnetic recording layer 5 is formed by using a sputtering gas pressure of 2 Pa under an $(Ar+O_2)$ atmosphere. A mass-flow ratio between Ar and $O_2$ ($O_2$/Ar) is 0.2%.

An examination was made to find the contents of the B and O elements in the layered magnetic recording layer 5 of the magnetic recording medium 1 by means of a chemical analysis, an energy-dispersive x-ray (hereafter referred to as the EDX), and a secondary ion mass spectrometer (hereafter referred to as the SIMS). As a result, the B element content was 3 atomic %; the O element content was 0.3 atomic %.

Table 1 lists measurement results for a vertical coercive force Hc and a signal-to-noise (S/N) ratio of the magnetic recording medium 1 fabricated as mentioned above. The S/N ratio is measured as follows. The magnetic recording medium 1 is rotated so that a relative speed against a magnetic head becomes 15 m/sec. A signal with the frequency of 50 MHz is recorded on the magnetic recording medium by using a magnetoresistive head (MR head) having a recording track width of 1.2 μm. The S/N ratio is determined to be a ratio of a 50 MHz signal in the reproduction signal to a noise strength found by integrating noises from 0 to 80 MHz.

TABLE 1

|  | Layer composition | Hc | S/N |
| --- | --- | --- | --- |
| Embodiment 1 | (CoBO-0.4 nm/PdBO-0.6 nm) × 20/Pd-20 nm | 2.0 kOe | 28 dB |
| Embodiment 7 | (CoBO-0.4 nm/PdBO-0.6 nm) × 20/Pd-20 nm | 2.3 kOe | 30 dB |
| Embodiment 15 | (CoBO-0.4 nm/PdBO-0.6 nm) × 20/(Pd + $SiO_2$)-20 nm | 2.0 kOe | 30 dB |
| Embodiment 37 | (CoBO-0.4 nm/PdBO-0.6 nm) × 20/(Pd + $SiO_2$)-10 nm/ $Ni_{80}Fe_{15}Ta_5$-20 nm | — | 32 dB |
| Comparative example 1 | (Co-0.4 nm/Pd-0.6 nm) × 20/Pd-20 nm | 3.4 kOe | 12 dB |

The magnetic recording medium 1 fabricated in embodiment 1 provides the stable Hc against magnetic and thermal disturbances. A transition noise is remarkably improved by maintaining a practically available value capable of recording by means of a conventional recording head. Consequently, the S/N ratio is 28 dB, an excellent value.

<Embodiment 2>

A magnetic recording medium is fabricated in the same manner as embodiment 1 except that the base layer is Pt.

The measurement was conducted to determine a vertical coercive force Hc and a signal-to-noise (S/N) ratio of the magnetic recording medium fabricated as mentioned above. The result was an effect equivalent to embodiment 1.

<Embodiment 3>

A magnetic recording medium is fabricated in the same manner as embodiment 1 except that the base layer is Au.

The measurement was conducted to determine a vertical coercive force Hc and a signal-to-noise (S/N) ratio of the magnetic recording medium fabricated as mentioned above. The result was an effect equivalent to embodiment 1.

<Embodiment 4>

A magnetic recording medium is fabricated in the same manner as embodiment 1 except that the base layer is Ag.

The measurement was conducted to determine a vertical coercive force Hc and a signal-to-noise (S/N) ratio of the magnetic recording medium fabricated as mentioned above. The result was an effect equivalent to embodiment 1.

<Embodiment 5>

A magnetic recording medium is fabricated in the same manner as embodiment 1 except that the base layer is Rh.

The measurement was conducted to determine a vertical coercive force Hc and a signal-to-noise (S/N) ratio of the magnetic recording medium fabricated as mentioned above. The result was an effect equivalent to embodiment 1.

<Embodiment 6>

A magnetic recording medium is fabricated in the same manner as embodiment 1 except that the base layer is Ir.

The measurement was conducted to determine a vertical coercive force Hc and a signal-to-noise (S/N) ratio of the magnetic recording medium fabricated as mentioned above. The result was an effect equivalent to embodiment 1.

<Embodiment 7>

In embodiment 7, a magnetic recording medium is fabricated by including B and O elements both in a vertically magnetized film as a layered magnetic recording layer and in a base layer.

Figure 5:
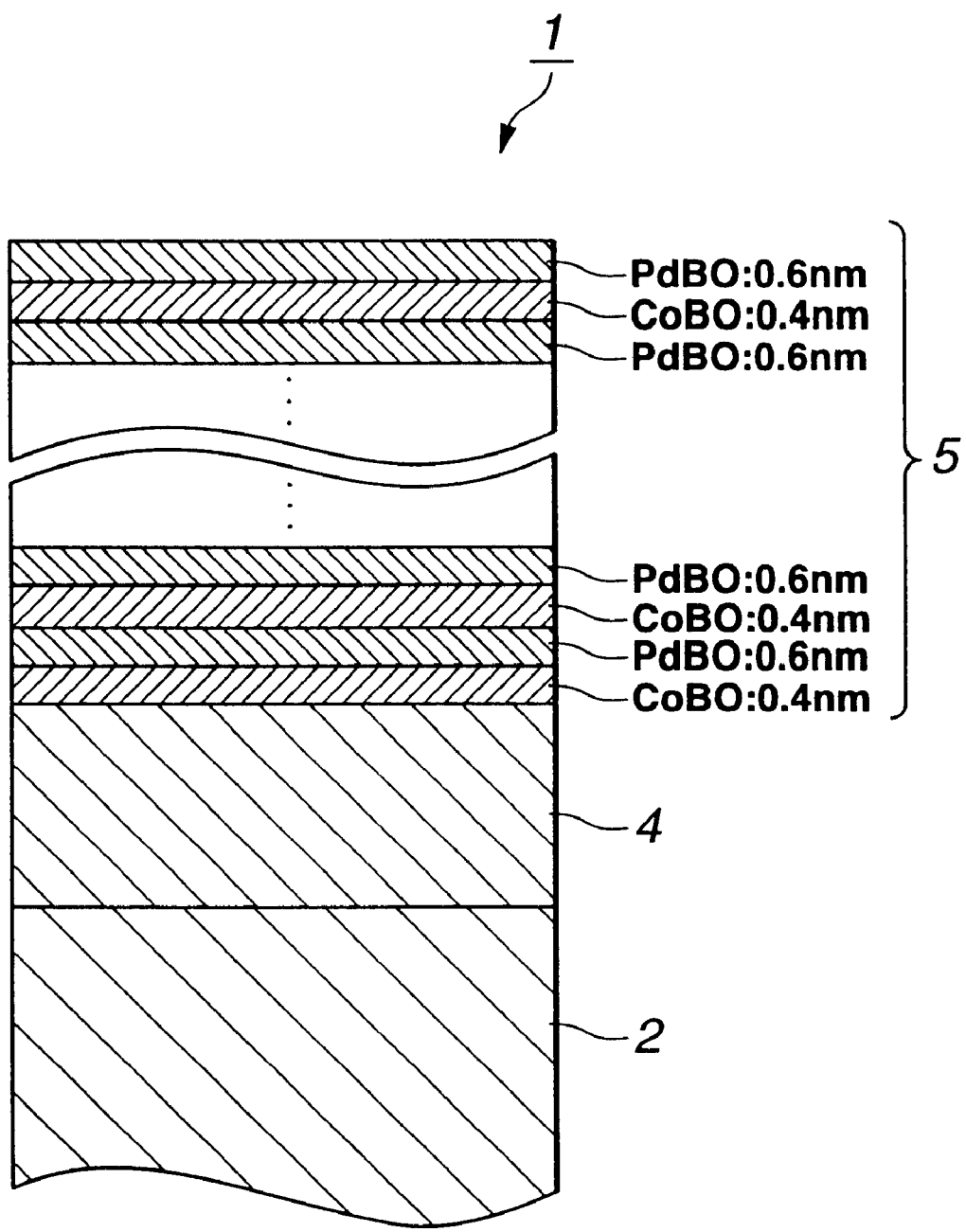
FIG. 5 is a sectional view partially showing a layer structure of a magnetic recording medium fabricated according to embodiment 7.

The magnetic recording medium is fabricated in the same manner as embodiment 1. The composition and the configuration of each layer are (CoBO: 0.4 nm /PdBO: 0.6 nm)×20/PdBO: 20 nm. There is fabricated the magnetic recording medium 1 having a sectional structure as shown in FIG. 5.

Figure 6:
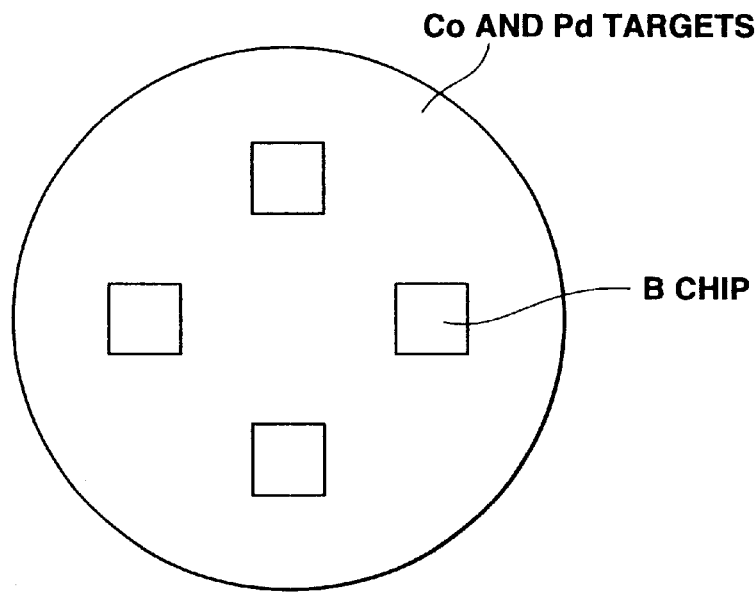
FIG. 6 is a top view showing a sputtering target used for fabricating the magnetic recording medium according to the present invention.

As sputtering targets, the base layer 4 uses a Pd target comprising four B chips, 1 by 1 cm each, arranged thereon as shown in FIG. 6. The layered magnetic recording layer 5 uses Co and Pd targets comprising four B chips, 1 by 1 cm each, arranged thereon as shown in FIG. 6.

An examination was made to find the contents of the B and O elements in the layered magnetic recording layer 5 of the magnetic recording medium 1 by means of a chemical analysis, the EDX, and the SIMS. As a result, the B element content was 3 atomic %; the O element content was 0.2 atomic %.

Table 1 lists measurement results for a vertical coercive force Hc and a signal-to-noise (S/N) ratio of the magnetic recording medium 1 fabricated as mentioned above. The S/N ratio is found in the same manner as embodiment 1.

The magnetic recording medium fabricated in embodiment 7 further improves the problem of a transition noise compared to the magnetic recording medium fabricated in embodiment 1. The S/N ratio results in 30 dB, showing an excellent value. This magnetic recording layer increases crystallographic discreteness in the base layer by including the B and O elements also in the Pd base layer. This also increases the crystallographic discreteness in the Co/Pd layered magnetic recording layer formed thereon. Consequently, it is considered that a transition noise decreases in the layered magnetic recording layer, increasing the S/N ratio.

<Embodiment 8>

A magnetic recording medium is fabricated in the same manner as embodiment 7 except that the base layer is PtBO.

The measurement was conducted to determine a vertical coercive force Hc and a signal-to-noise (S/N) ratio of the magnetic recording medium fabricated as mentioned above. The result was an effect equivalent to embodiment 7.

<Embodiment 9>

A magnetic recording medium is fabricated in the same manner as embodiment 7 except that the base layer is AuBO.

The measurement was conducted to determine a vertical coercive force Hc and a signal-to-noise (S/N) ratio of the magnetic recording medium fabricated as mentioned above. The result was an effect equivalent to embodiment 7.

<Embodiment 10>

A magnetic recording medium is fabricated in the same manner as embodiment 7 except that the base layer is AgBO.

The measurement was conducted to determine a vertical coercive force Hc and a signal-to-noise (S/N) ratio of the magnetic recording medium fabricated as mentioned above. The result was an effect equivalent to embodiment 7.

<Embodiment 11>

A magnetic recording medium is fabricated in the same manner as embodiment 7 except that the base layer is RhBO.

The measurement was conducted to determine a vertical coercive force Hc and a signal-to-noise (S/N) ratio of the magnetic recording medium fabricated as mentioned above. The result was an effect equivalent to embodiment 7.

<Embodiment 12>

A magnetic recording medium is fabricated in the same manner as embodiment 7 except that the base layer is IrBO.

The measurement was conducted to determine a vertical coercive force Hc and a signal-to-noise (S/N) ratio of the magnetic recording medium fabricated as mentioned above. The result was an effect equivalent to embodiment 7.

<Embodiment 13>

Embodiment 13 examined an effect of the B element content in the layered magnetic recording layer on the S/N ratio.

The O element content is fixed to 0.2 atomic % in the layered magnetic recording layer. Eight types of magnetic recording media are fabricated in the same manner as embodiment 1 except that the B element contents are changed to 0, 0.5, 0.7, 1, 1.8, 3, 4.3, and 5 atomic %. The composition and the configuration of each layer are (CoBO: 0.4 nm/PdBO: 0.6 nm)×20/Pd: 20 nm. There is fabricated the magnetic recording medium 1 having a sectional structure as shown in FIG. 4.

The B element content in the layered magnetic recording layer 5 is controlled by the number of B chips arranged on the sputtering target. The O element content is controlled by the mass-flow ratio between Ar and $O_2$ ($O_2$/Ar).

The B and O element contents in the layered magnetic recording layer 5 of the magnetic recording medium 1 are comprehensively analyzed by using the chemical analysis, the EDX, and the SIMS.

Figure 7:
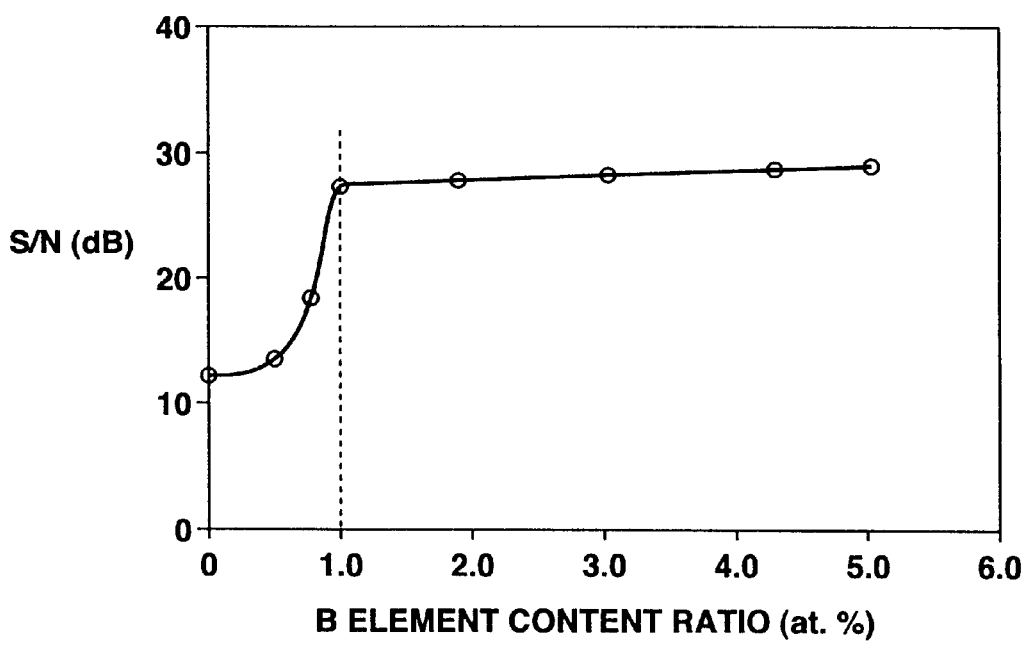
FIG. 7 is a characteristic chart showing relationship between a B element content and an S/N ratio.

FIG. 7 shows the vertical signal-to-noise (S/N) ratios examined for the eight types of magnetic recording media fabricated as mentioned above. Each S/N ratio is found in the same manner as embodiment 1.

Figure 8:
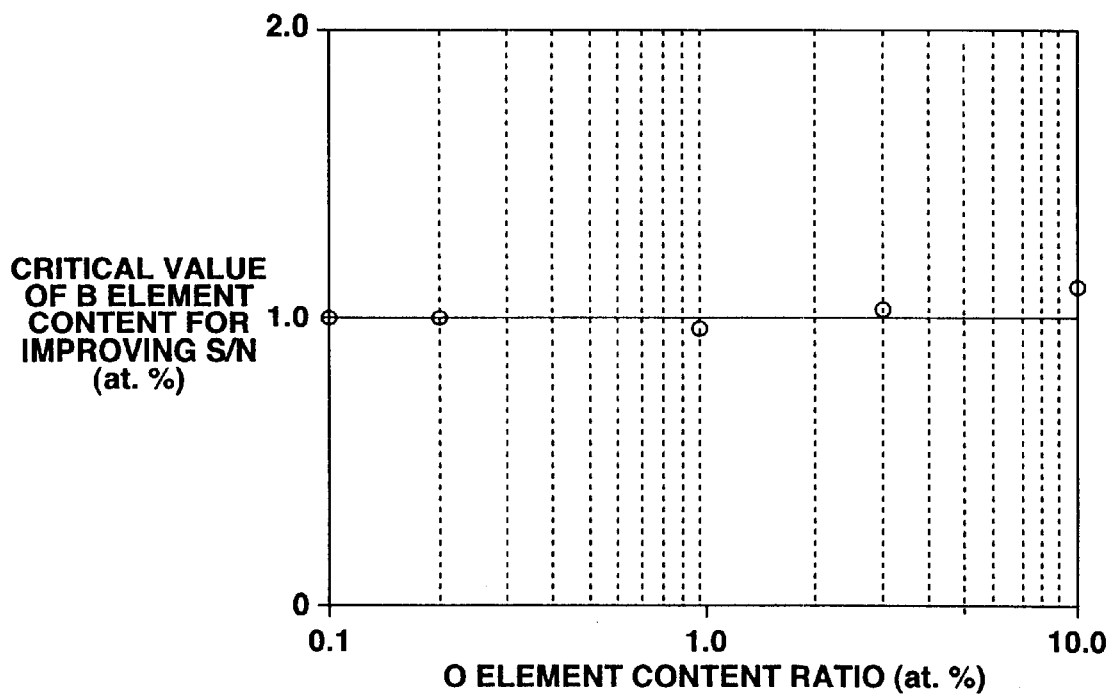
FIG. 8 is a characteristic chart showing relationship between an O element content and a critical value of a B element content for improving the S/N ratio.

According to FIG. 7, it is understood that the S/N ratio remarkably rises approximately at the B element content of 1 atomic % and keeps an almost constant value in the succeeding range. FIG. 8 shows critical values for the B element contents corresponding to increased S/N ratios measured by varying O element contents. As seen from FIG. 8, critical values for the B element contents corresponding to increased S/N ratios are almost constant independently of the O element contents under the condition that the O element content is 0.1 atomic % or more.

According to the above-mentioned result, it is understood that the B element content of 1 atomic % or more is needed for crystallographic discreteness in the layered magnetic recording layer. This condition is same as that for ensuring the crystallographic discreteness for the base layer comprising PdBO in the above-mentioned embodiment 7.

<Embodiment 14>

Embodiment 14 examined an effect of the O element content in the layered magnetic recording layer on the S/N ratio.

The B element content is fixed to 3 atomic %. Eight types of magnetic recording media are fabricated in the same manner as embodiment 1 except that the B element contents are changed to 0, 0.05, 0.08, 0.1, 0.2, 0.3, 0.37, and 0.48 atomic %. Like embodiment 1, the composition and the configuration of each layer are (CoBO: 0.4 nm/PdBO: 0.6 nm)×20/Pd: 20 nm. There is fabricated the magnetic recording medium 1 having a sectional structure as shown in FIG. 4.

The B element content in the layered magnetic recording layer 5 is controlled by the number of B chips arranged on the sputtering target. The O element content is controlled by the mass-flow ratio between Ar and $O_2$ ($O_2$/Ar).

Like embodiment 13, the B and O element contents in the layered magnetic recording layer 5 of the magnetic recording medium 1 are comprehensively analyzed by using the chemical analysis, the EDX, and the SIMS.

Figure 9:
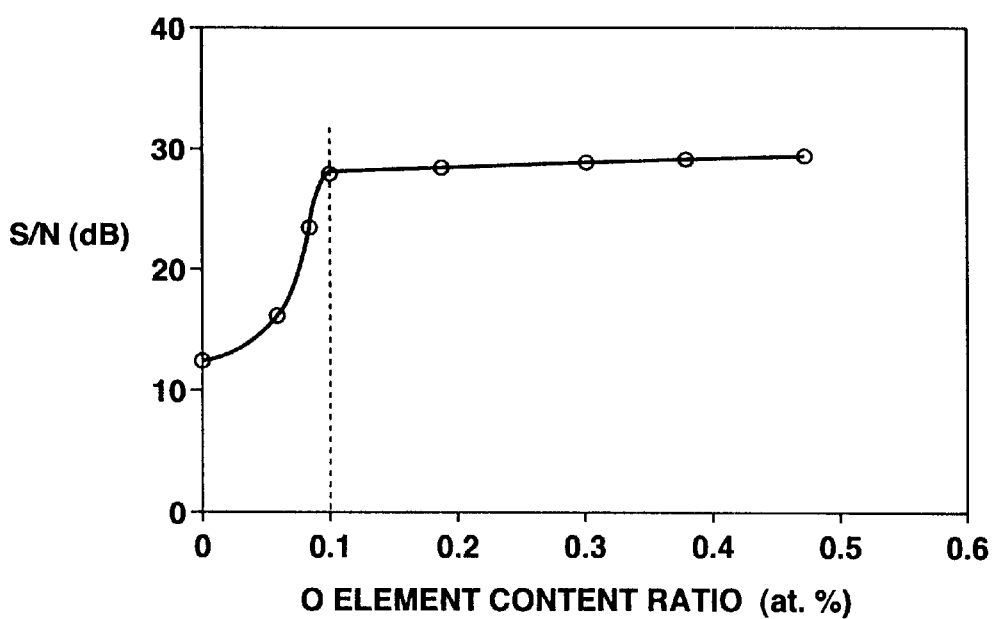
FIG. 9 is a characteristic chart showing relationship between an O element content and an S/N ratio.

FIG. 9 shows the vertical signal-to-noise (S/N) ratios examined for the eight types of magnetic recording media fabricated as mentioned above. Each S/N ratio is found in the same manner as embodiment 1.

Figure 10:
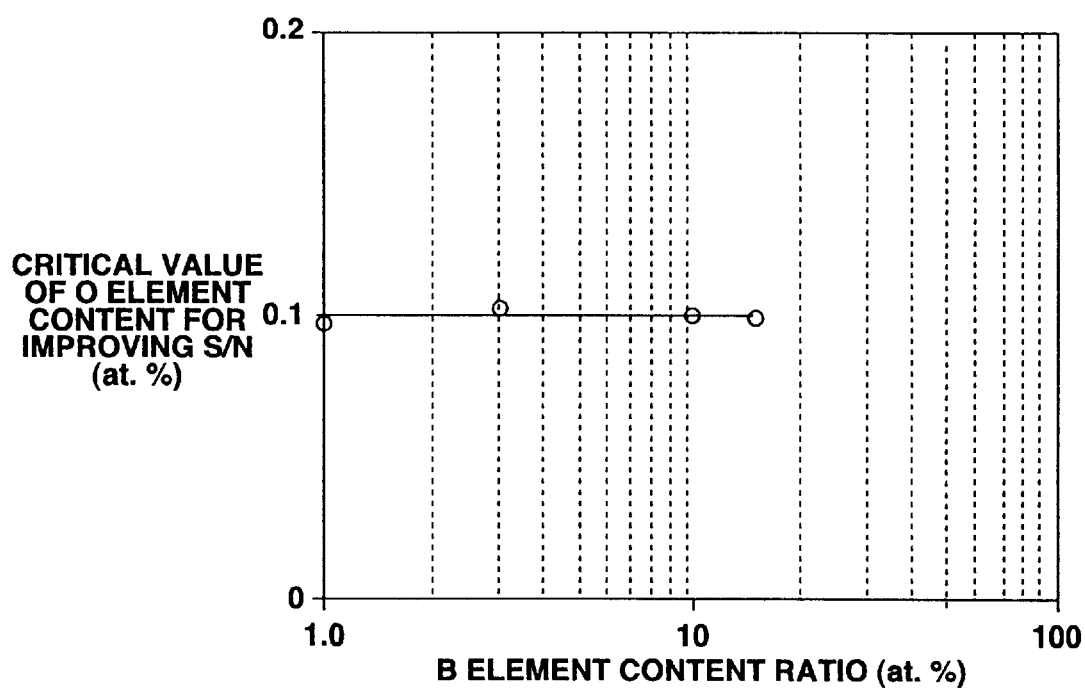
FIG. 10 is a characteristic chart showing relationship between a B element content and a critical value of an O element content for improving the S/N ratio.

According to FIG. 9, it is understood that the S/N ratio remarkably rises approximately at the O element content of 0.1 atomic % and keeps an almost constant value in the succeeding range. FIG. 10 shows critical values for the O element contents corresponding to increased S/N ratios measured by varying B element contents. As seen from FIG. 10, critical values for the O element contents corresponding to increased S/N ratios are almost constant independently of the B element contents under the condition that the B element content is 1 atomic % or more.

According to the above-mentioned result, it is understood that the O element content of 0.1 atomic % or more is needed for crystallographic discreteness in the layered magnetic recording layer. This condition is same as that for ensuring the crystallographic discreteness for the base layer comprising PdBO in the above-mentioned embodiment 7.

<Embodiment 15>

Embodiment 15 fabricates a magnetic recording medium by including B and O elements in the vertically magnetized film as a layered magnetic recording layer, and using a composite base layer by concurrently forming Pd and $SiO_2$.

Figure 11:
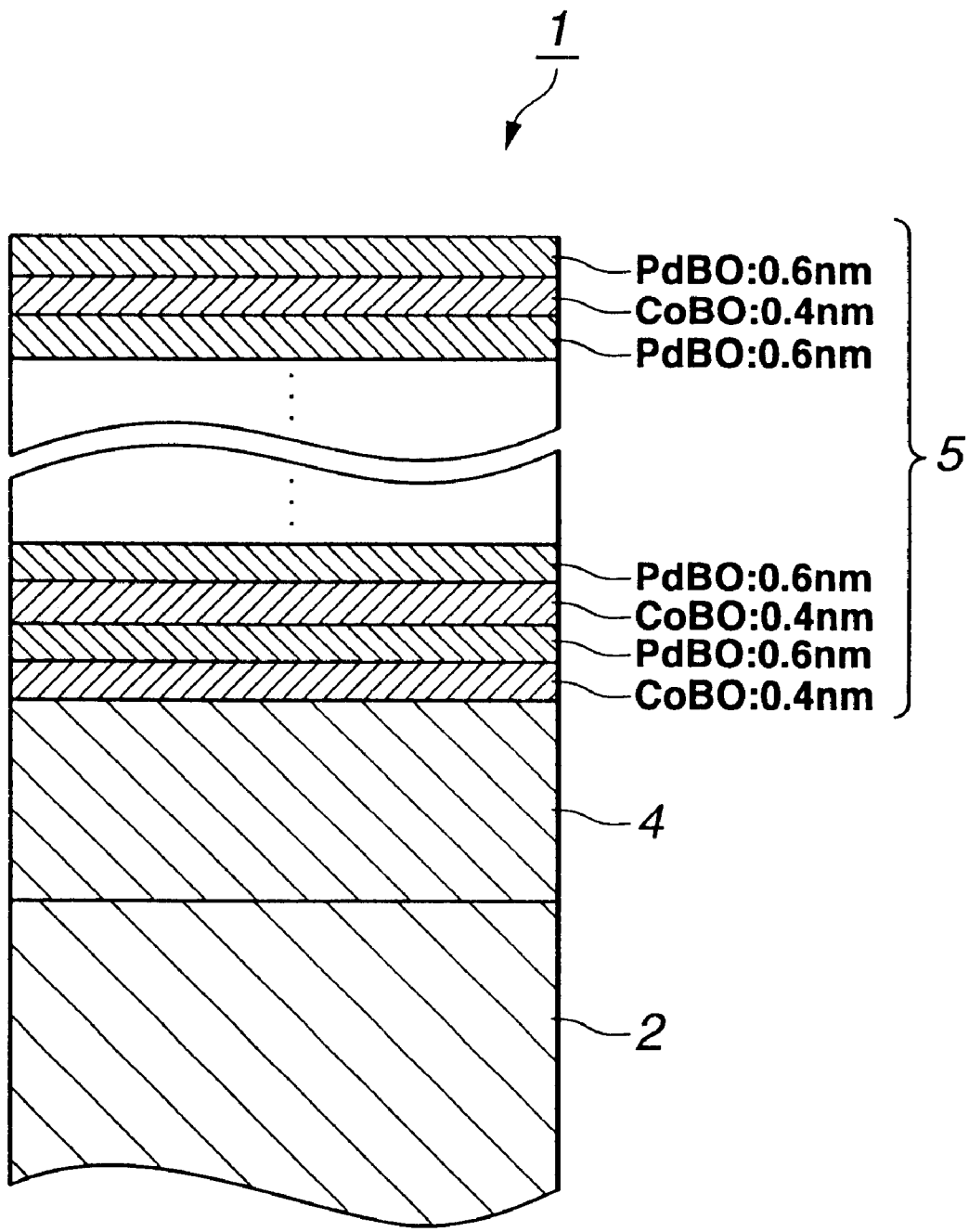
FIG. 11 is a sectional view partially showing a layer structure of a magnetic recording medium fabricated according to embodiment 15.

The composition and the configuration of each layer are (CoBO: 0.4 nm/PdBO: 0.6 nm)×20/Pd+$SiO_2$: 20 nm. There is fabricated a magnetic recording medium having a sectional structure as shown in FIG. 11.

The magnetic recording medium is fabricated in the same manner as embodiment 1 except that the composite base layer is formed according to RF magnetron sputtering by using an $SiO_2$ target with Pd chips arranged thereon. The composite base layer comprises 50% of Pd and 50% of $SiO_2$ according to a volume ratio.

The chemical analysis, the EDX, and the SIMS are used to examine the B and O element contents in the layered magnetic recording layer 5 of the fabricated magnetic recording medium 1. The examination result shows that the B element content is 3 atomic % and the O element content is 0.2 atomic %.

Table 1 lists measurement results for a vertical coercive force Hc and a signal-to-noise (S/N) ratio of the magnetic recording medium 1 fabricated as mentioned above. The S/N ratio is found in the same manner as embodiment 1.

The magnetic recording medium fabricated in embodiment 15 further improves the problem of a transition noise compared to the magnetic recording medium fabricated in embodiment 1. The SIN ratio results in 31 dB, showing an excellent value almost equivalent to that for the magnetic recording medium in embodiment 7. Compared to embodiment 1, this magnetic recording layer further increases crystallographic discreteness in the CoBO/PdBO layered magnetic recording layer 5 by using a Pd+$SiO_2$ composite base layer as the base layer 4. Consequently, it is considered that a transition noise decreases, increasing the S/N ratio.

<Embodiment 16>

A magnetic recording medium is fabricated in the same manner as embodiment 15 except that the base layer is Pd+$SiO_2$.

The measurement was conducted to determine a vertical coercive force Hc and a signal-to-noise (S/N) ratio of the magnetic recording medium fabricated as mentioned above. The result was an effect equivalent to embodiment 15.

<Embodiment 17>

A magnetic recording medium is fabricated in the same manner as embodiment 15 except that the base layer is Au+$Al_2O_3$.

The measurement was conducted to determine a vertical coercive force Hc and a signal-to-noise (S/N) ratio of the magnetic recording medium fabricated as mentioned above. The result was an effect equivalent to embodiment 15.

<Embodiment 18>

A magnetic recording medium is fabricated in the same manner as embodiment 15 except that the base layer is Ag+MgO.

The measurement was conducted to determine a vertical coercive force Hc and a signal-to-noise (S/N) ratio of the magnetic recording medium fabricated as mentioned above. The result was an effect equivalent to embodiment 15.

<Embodiment 19>

A magnetic recording medium is fabricated in the same manner as embodiment 15 except that the base layer is Rh+$TiO_2$.

The measurement was conducted to determine a vertical coercive force Hc and a signal-to-noise (S/N) ratio of the magnetic recording medium fabricated as mentioned above. The result was an effect equivalent to embodiment 15.

<Embodiment 20>

A magnetic recording medium is fabricated in the same manner as embodiment 15 except that the base layer is Ir+$LiO_2$.

The measurement was conducted to determine a vertical coercive force Hc and a signal-to-noise (S/N) ratio of the magnetic recording medium fabricated as mentioned above. The result was an effect equivalent to embodiment 15.

<Embodiment 21>

A magnetic recording medium is fabricated in the same manner as embodiment 15 except that the base layer is Pd+CaO.

The measurement was conducted to determine a vertical coercive force Hc and a signal-to-noise (S/N) ratio of the magnetic recording medium fabricated as mentioned above. The result was an effect equivalent to embodiment 15.

<Embodiment 22>

A magnetic recording medium is fabricated in the same manner as embodiment 15 except that the base layer is Pd+ZnO.

The measurement was conducted to determine a vertical coercive force Hc and a signal-to-noise (S/N) ratio of the magnetic recording medium fabricated as mentioned above. The result was an effect equivalent to embodiment 15.

<Embodiment 23>

A magnetic recording medium is fabricated in the same manner as embodiment 15 except that the base layer is Pd+ZrO.

The measurement was conducted to determine a vertical coercive force Hc and a signal-to-noise (S/N) ratio of the magnetic recording medium fabricated as mentioned above. The result was an effect equivalent to embodiment 15.

<Embodiment 24>

A magnetic recording medium is fabricated in the same manner as embodiment 15 except that the base layer is $Pd+Y_2O_3$.

The measurement was conducted to determine a vertical coercive force Hc and a signal-to-noise (S/N) ratio of the magnetic recording medium fabricated as mentioned above. The result was an effect equivalent to embodiment 15.

<Embodiment 25>

A magnetic recording medium is fabricated in the same manner as embodiment 15 except that the base layer is Pd+HfO.

The measurement was conducted to determine a vertical coercive force Hc and a signal-to-noise (S/N) ratio of the magnetic recording medium fabricated as mentioned above. The result was an effect equivalent to embodiment 15.

<Embodiment 26>

A magnetic recording medium is fabricated in the same manner as embodiment 15 except that the base layer is Pd+HfO.

The measurement was conducted to determine a vertical coercive force Hc and a signal-to-noise (S/N) ratio of the magnetic recording medium fabricated as mentioned above. The result was an effect equivalent to embodiment 15.

<Embodiment 27>

A magnetic recording medium is fabricated in the same manner as embodiment 15 except that the base layer is $Pd+Si_3N_4$.

The measurement was conducted to determine a vertical coercive force Hc and a signal-to-noise (S/N) ratio of the magnetic recording medium fabricated as mentioned above. The result was an effect equivalent to embodiment 15.

<Embodiment 28>

A magnetic recording medium is fabricated in the same manner as embodiment 15 except that the base layer is Pt+AlN.

The measurement was conducted to determine a vertical coercive force Hc and a signal-to-noise (S/N) ratio of the magnetic recording medium fabricated as mentioned above. The result was an effect equivalent to embodiment 15.

<Embodiment 29>

A magnetic recording medium is fabricated in the same manner as embodiment 15 except that the base layer is Au+BN.

The measurement was conducted to determine a vertical coercive force Hc and a signal-to-noise (S/N) ratio of the magnetic recording medium fabricated as mentioned above. The result was an effect equivalent to embodiment 15.

<Embodiment 30>

A magnetic recording medium is fabricated in the same manner as embodiment 15 except that the base layer is Ag+TiN.

The measurement was conducted to determine a vertical coercive force Hc and a signal-to-noise (S/N) ratio of the magnetic recording medium fabricated as mentioned above. The result was an effect equivalent to embodiment 15.

<Embodiment 31>

A magnetic recording medium is fabricated in the same manner as embodiment 15 except that the base layer is Rh+ZrN.

The measurement was conducted to determine a vertical coercive force Hc and a signal-to-noise (S/N) ratio of the magnetic recording medium fabricated as mentioned above. The result was an effect equivalent to embodiment 15.

<Embodiment 32>

A magnetic recording medium is fabricated in the same manner as embodiment 15 except that the base layer is Ir+GaN.

The measurement was conducted to determine a vertical coercive force Hc and a signal-to-noise (S/N) ratio of the magnetic recording medium fabricated as mentioned above. The result was an effect equivalent to embodiment 15.

<Embodiment 33>

A magnetic recording medium is fabricated in the same manner as embodiment 15 except that the base layer is Pd+SiC.

The measurement was conducted to determine a vertical coercive force Hc and a signal-to-noise (S/N) ratio of the magnetic recording medium fabricated as mentioned above. The result was an effect equivalent to embodiment 15.

<Embodiment 34>

A magnetic recording medium is fabricated in the same manner as embodiment 15 except that the base layer is Pt+TiC.

The measurement was conducted to determine a vertical coercive force Hc and a signal-to-noise (S/N) ratio of the magnetic recording medium fabricated as mentioned above. The result was an effect equivalent to embodiment 15.

<Embodiment 35>

A magnetic recording medium is fabricated in the same manner as embodiment 15 except that the base layer is Au+ZrC.

The measurement was conducted to determine a vertical coercive force Hc and a signal-to-noise (S/N) ratio of the magnetic recording medium fabricated as mentioned above. The result was an effect equivalent to embodiment 15.

<Embodiment 36>

A magnetic recording medium is fabricated in the same manner as embodiment 15 except that the base layer is Ag+TaC.

The measurement was conducted to determine a vertical coercive force Hc and a signal-to-noise (S/N) ratio of the magnetic recording medium fabricated as mentioned above. The result was an effect equivalent to embodiment 15.

The results of embodiments 15 through 36 ensured an effect of decreasing a transition noise in the layered magnetic recording layer and increasing the S/N ratio by configuring the base layer using the following composite materials. Namely, an available composite material comprises any of metals having the face-centered cubic structure such as Pd, Pt, Au, Ag, Rh, and Ir and any of oxides such as $SiO_2$, $Al_2O_3$, MgO, $TiO_2$, $Li_2O$, CaO, ZnO, ZrO, $Y_2O_3$, HfO, and the like. Another composite material comprises any of metals having the face-centered cubic structure such as Pt, Au, Pd, Ag, Rh, and Ir and any of nitrides such as $Si_3N_4$, AlN, BN, TiN, ZrN, GaN, and the like. Yet another composite material comprises any of metals having the face-centered cubic structure such as Pt, Au, Pd, Ag, Rh, and Ir and any of carbides such as SiC, TiC, ZrC, TaC, and the like.

<Embodiment 37>

Embodiment 37 fabricates a magnetic recording medium by forming a soft magnetic layer comprising NiFeTa under the base layer and a layered magnetic recording layer on the base layer.

Figure 12:
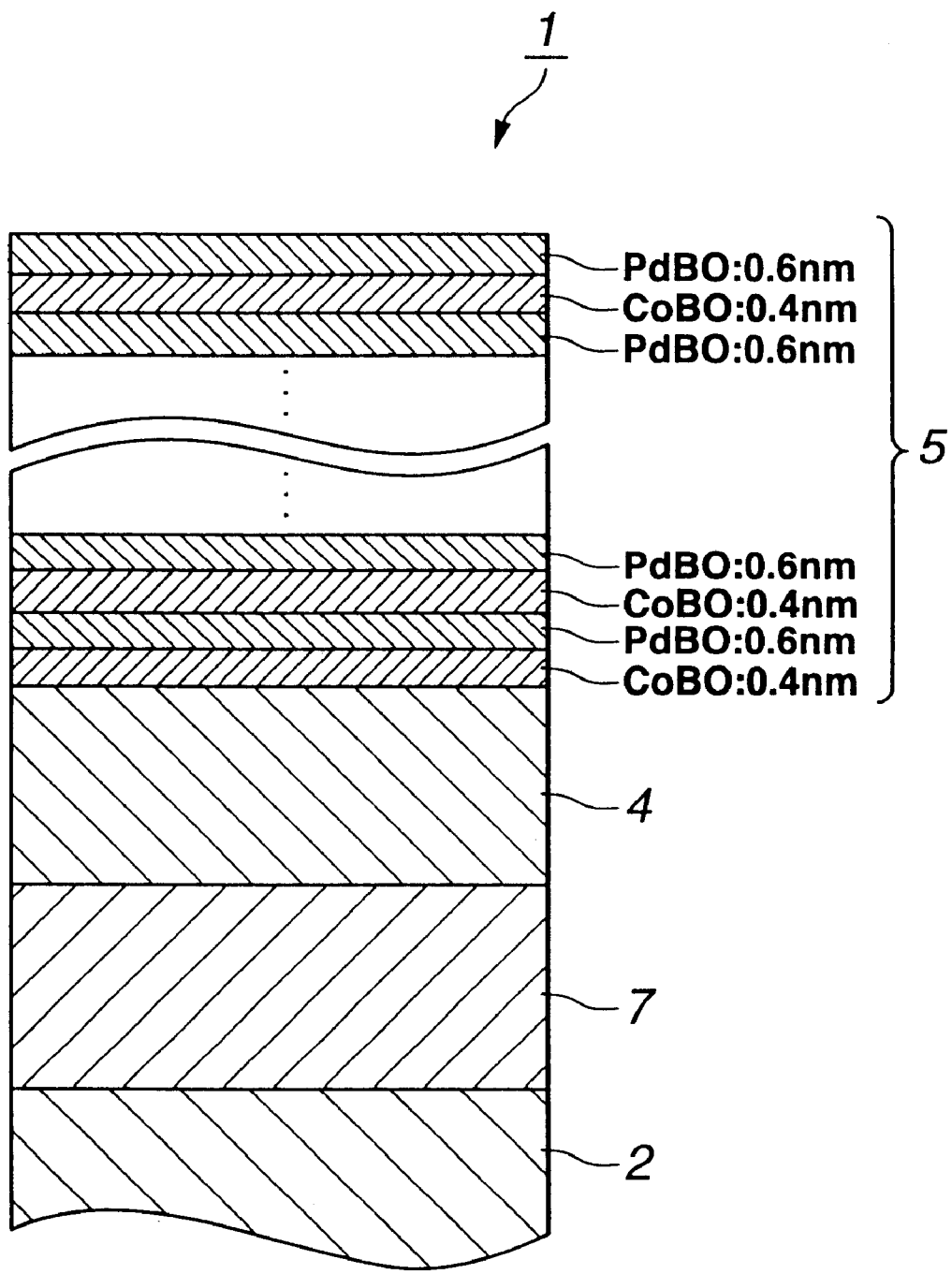
FIG. 12 is a sectional view partially showing a layer structure of a magnetic recording medium fabricated according to embodiment 36.

The composition and the configuration of each layer in the magnetic recording medium are (CoBO: 0.4 nm/PdBO: 0.6 nm)×20/(Pd+$SiO_2$): 20 nm/$Ni_{80}Fe_{15}Ta_5$: 20 nm. There is fabricated the magnetic recording medium 1 having a sectional structure as shown in FIG. 12.

The magnetic recording medium is fabricated in the same manner as embodiment 15 except that the soft magnetic layer is formed according to the sputtering process using Ni, Fe, and Ta targets.

The chemical analysis, the EDX, and the SIMS are used to examine the B and O element contents in the layered magnetic recording layer 5 of the fabricated magnetic recording medium 1. The examination result shows that the B element content is 3 atomic % and the O element content is 0.2 atomic %.

Table 1 lists measurement results for a signal-to-noise (S/N) ratio of the magnetic recording medium 1 fabricated as mentioned above. The S/N ratio is found in the same manner as embodiment 1.

The magnetic recording medium 1 according to embodiment 37 further distinctively provides a transition region for the magnetic domain in the layered magnetic recording layer by using the $Ni_{80}Fe_{15}Ta_5$ soft magnetic layer as a backing layer. Accordingly, the S/N ratio results in 32 dB, showing an excellent value much more improved than embodiments 1, 7, and 15.

<Embodiment 38>

A magnetic recording medium is fabricated in the same manner as embodiment 37 except that the soft magnetic layer is CoZr.

The measurement was conducted to determine a signal-to-noise (S/N) ratio of the magnetic recording medium fabricated as mentioned above. The result was an effect equivalent to embodiment 37.

<Embodiment 39>

A magnetic recording medium is fabricated in the same manner as embodiment 37 except that the soft magnetic layer is FeN.

The measurement was conducted to determine a signal-to-noise (S/N) ratio of the magnetic recording medium fabricated as mentioned above. The result was an effect equivalent to embodiment 37.

The results of embodiments 37 through 39 ensured that it is possible to further distinctively provide a transition region for the magnetic domain in the layered magnetic recording layer by sandwiching the base layer between the layered magnetic recording layer and the soft magnetic layer as a backing layer. Consequently, it was also confirmed that the S/N ratio can be increased.

Comparative Example

The comparative example fabricates a conventional magnetic recording medium 1 without B and O elements contained in the vertically magnetized film as a layered magnetic recording layer and the base layer.

Figure 13:
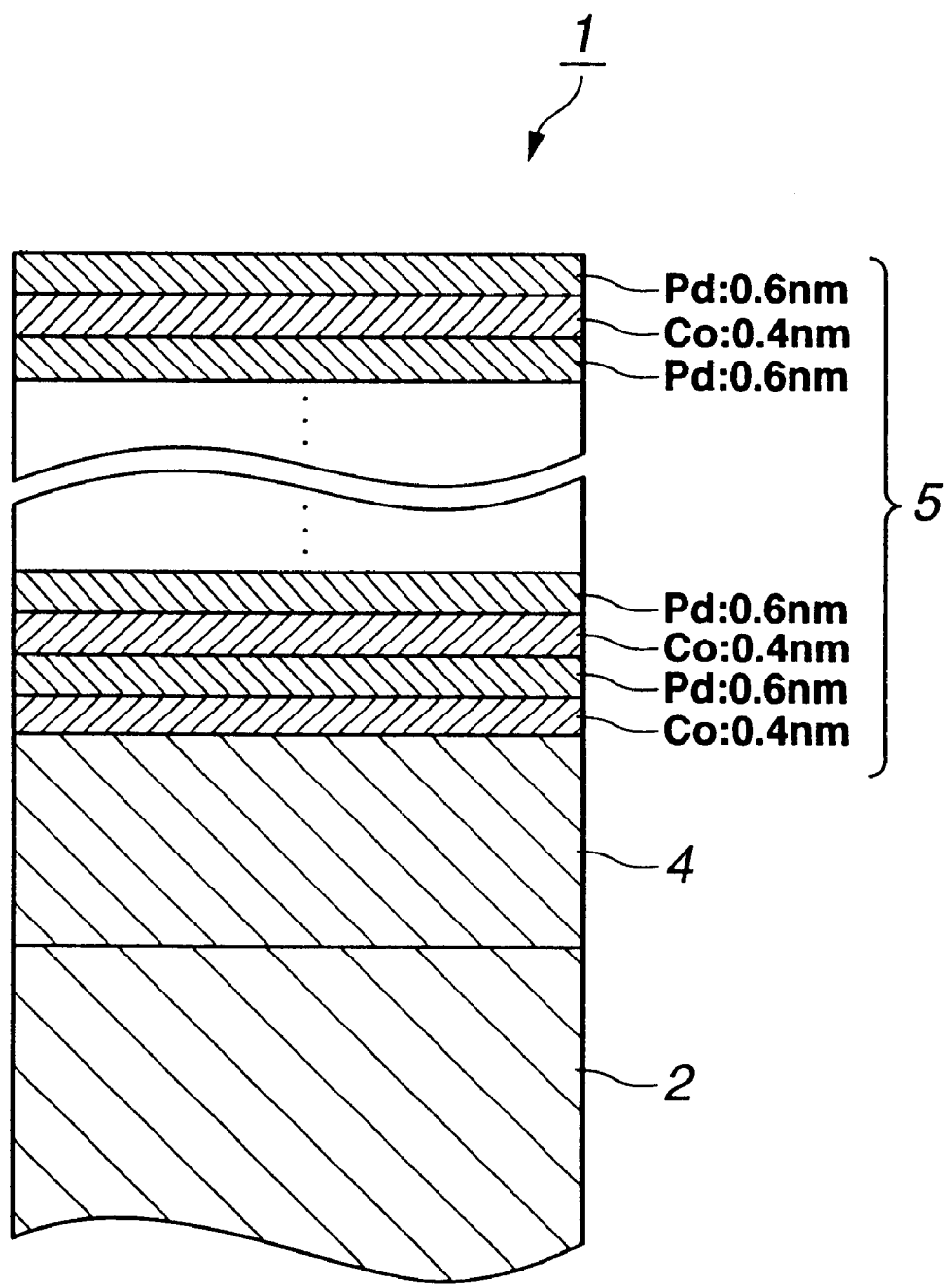
FIG. 13 is a sectional view partially showing a layer structure of a magnetic recording medium fabricated according to a comparative example.

The magnetic recording medium 1 is fabricated in the same manner as embodiment 1. The composition and the configuration of each layer are (Co: 0.4 nm/Pd: 0.6 nm)× 20/Pd: 20 nm. There is fabricated the magnetic recording medium 1 having a sectional structure as shown in FIG. 13.

As sputtering targets, a Pd target is used for the base layer 4. Co and Pd targets are used for the layered magnetic recording layer 5. The film formation was conducted by using a sputtering gas pressure of 2 Pa under an Ar atmosphere.

Table 1 lists measurement results for a vertical coercive force Hc and a signal-to-noise (S/N) ratio of the magnetic recording medium 1 fabricated as mentioned above. The S/N ratio is found in the same manner as embodiment 1.

The magnetic recording medium 1 fabricated in the comparative example provides the stable Hc against magnetic and thermal disturbances, showing a practically available value capable of recording by means of a conventional recording head. However, the transition noise is increased, showing the degraded S/N ratio as small as 12 dB.

Figure 14:
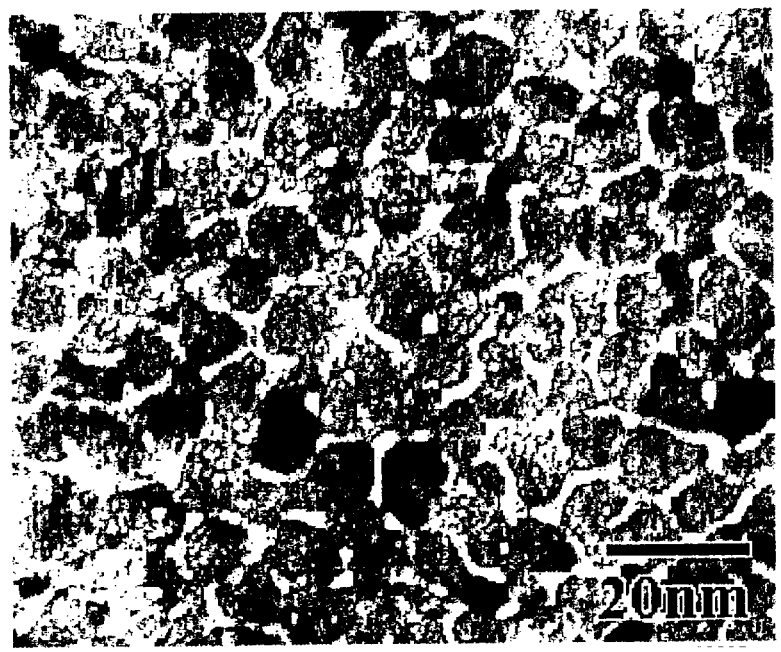
FIG. 14 shows a micrograph of an observation result using a TEM in embodiment 1.
Figure 15:
FIG. 15 shows a micrograph of an observation result using a TEM in the comparative example.

Here, embodiment 1 is compared to the comparative example by analyzing a fine structure of the layered magnetic recording layer using a transmission electron microscope (TEM). The purpose is to clarify a difference between embodiment 1 and the comparative example with respect to a transition noise in the layered magnetic recording layer of the magnetic recording medium. FIG. 14 shows an observation result using the TEM in embodiment 1. FIG. 15 shows an observation result using the TEM in the comparative example. The result is that the comparative example shows denseness among crystal grains while embodiment 1 shows space among them.

Figure 16:
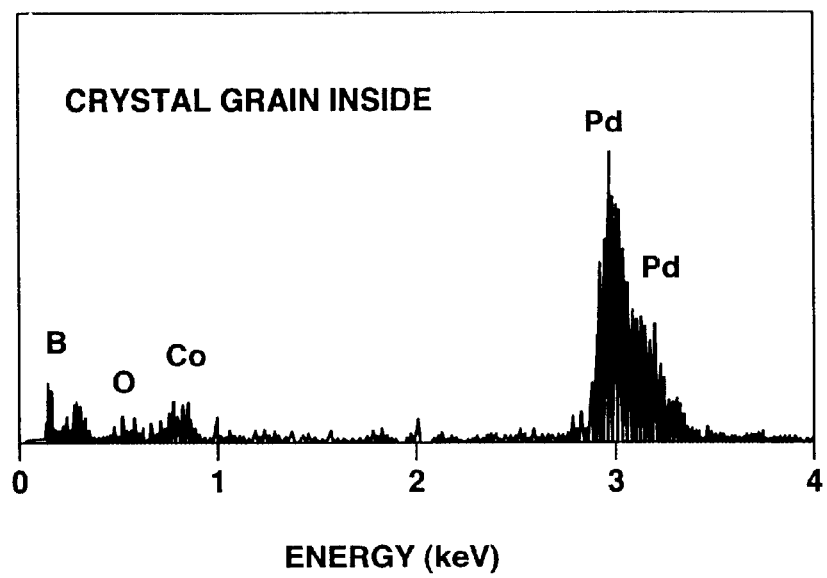
FIG. 16 is a characteristic chart showing an analysis result for a crystal grain inside using EDX.
Figure 17:
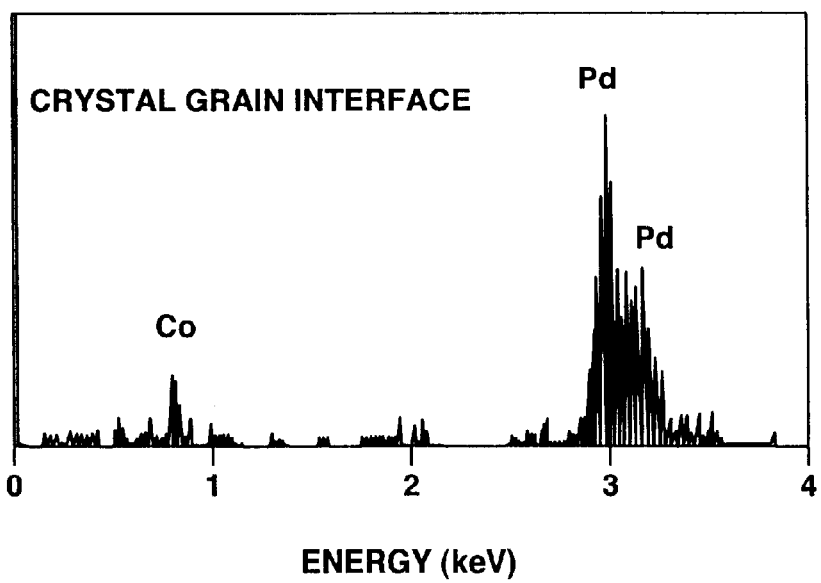
FIG. 17 is a characteristic chart showing an analysis result for a crystal grain interface using EDX.
Figure 18:
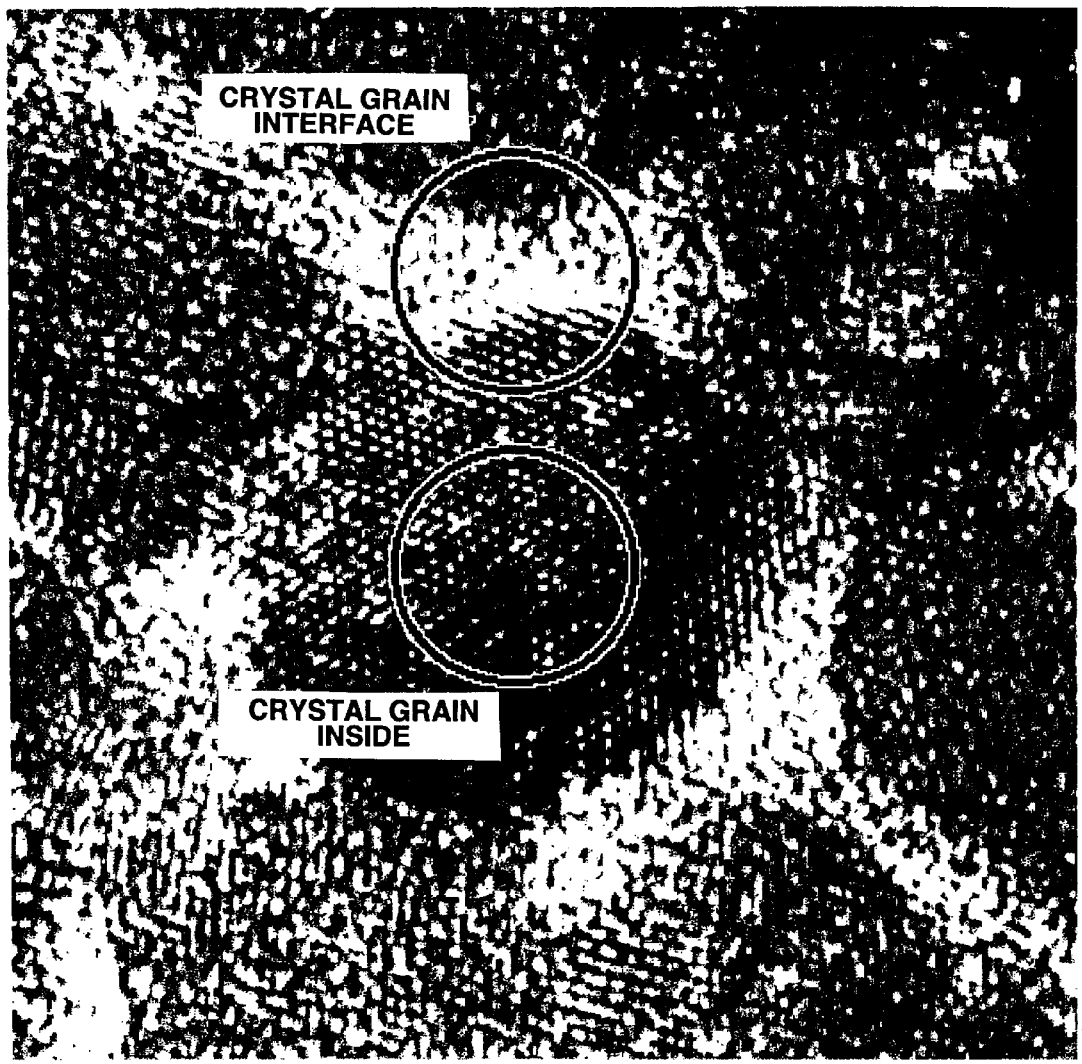
FIG. 18 shows a micrograph of an observation result using a high-resolution TEM in embodiment 1.

A high-resolution TEM and the EDX were used for analysis in order to clarify a crystal grain interface structure in embodiment 1. An analysis region for the EDX is approximately 5 nm. Analysis region A in the high-resolution TEM image provides element information about the crystal grain inside only. Analysis region B contains element information both about the crystal grain inside and about the crystal grain interface. FIG. 16 shows an analysis result for the crystal grain inside using the EDX. FIG. 17 shows an analysis result for the crystal grain interface using the EDX. FIG. 18 shows an observation result using the high-resolution TEM.

The image using the high-resolution TEM revealed that the circumference of crystal grains is filled with a amorphous material and that crystal grains mutually maintain the crystallographic discreteness.

When the spectra are compared between the crystal grain inside and the crystal grain interface, it is considered that the B and O elements are detected only in the crystal grain interface and that a boron oxide phase is deposited in the crystal grain interface.

These analysis results show indicate that the B and O elements play an important role in ensuring the crystallographic discreteness of the layered magnetic recording layer. Namely, the crystallographic discreteness among crystal grains causes magnetic discreteness, thus decreasing a transition noise and increasing the S/N ratio.

What is claimed is:

1. A magnetic recording medium comprising:

an artificial lattice film formed by alternately layering one of a Pr and a Pd layer, and a Co layer, said artificial lattice film containing B and O elements, and forming a perpendicular magnetic recording medium.

2. The magnetic recording medium according to claim 1, wherein said B element is contained in a range between 1 atomic % and 15 atomic %, and said O element is contained in a range between 0.1 atomic % and 10 atomic %.

3. The magnetic recording medium according to claim 1, further comprising:

a base layer, on which said artificial lattice film is layered; wherein said base layer includes a metal having a face-centered cubic crystal structure.

4. The magnetic recording medium according to claim 3, wherein said metal having the face-centered cubic structure is any one of Pd, Pt, Au ,Ag, Rh, and Ir.

5. The magnetic recording medium according to claim 3, wherein said base layer contains B and O elements.

6. The magnetic recording medium according to claim 5, wherein said B element is contained in a range between 1 atomic % and 30 atomic %, and said O element is contained in a range between 0.1 atomic % and 30 atomic %.

7. The magnetic recording medium according to claim 1, further comprising:
   a base layer, on which said artificial lattice film is layered;
   wherein said base layer comprises a composite material made of any of metals having a face-centered cubic crystal structure and any of oxides, nitrides and carbides.

8. The magnetic recording medium according to claim 7, wherein said metal having the face-centered cubic structure is any one of Pd, Pt, Au, Ag, Rh, and Ir.

9. The magnetic recording medium according to claim 8, wherein a soft magnetic layer is provided just under said base layer.

10. The magnetic recording medium according to claim 9, wherein said soft magnetic layer comprises any one of NiFe, CoZr, FeN, and NiFeTa.

11. The magnetic recording medium according to claim 7, wherein said oxide is any one of $SiO_2$, $Al_2O_3$, MgO, $TiO_2$, $Li_2O$, CaO, ZnO, ZrO, $Y_2O_3$, and HfO.

12. The magnetic recording medium according to claim 7, wherein said nitride is any one of $Si_3N_4$, AlN, BN, TiN, ZrN, and GaN.

13. The magnetic recording medium according to claim 7, wherein said carbide is any one of SiC, TiC, ZrC, and TaC.

* * * * *